F. FRANK.
WIRE STRETCHER.
APPLICATION FILED NOV. 26, 1919.

1,387,374. Patented Aug. 9, 1921.

Inventor
F. Frank,
By E. Hume Talbert, Attorney

UNITED STATES PATENT OFFICE.

FRED FRANK, OF DUBLIN, TEXAS.

WIRE-STRETCHER.

1,387,374.  Specification of Letters Patent.  Patented Aug. 9, 1921.

Application filed November 26, 1919. Serial No. 340,957.

*To all whom it may concern:*

Be it known that I, FRED FRANK, a citizen of the United States of America, residing at Dublin, in the county of Erath and State of Texas, have invented new and useful Improvements in Wire-Stretchers, of which the following is a specification.

The purpose of the invention is to provide a new and novel form of wire stretcher whereby repairs to wire fences and the like may be readily made.

A further purpose resides in the provision of a device of this character which is simple in construction, durable and effective in operation and inexpensive to manufacture.

Other and further purposes of the invention will appear in the following description wherein the same is set forth in detail.

To the exact construction in which it is shown and described, the invention is not to be restricted. The right is reserved to make any changes or alterations that the actual reduction to practice may suggest, provided such changes or alterations are compatible in spirit with the subjoined claim.

Figure 1:
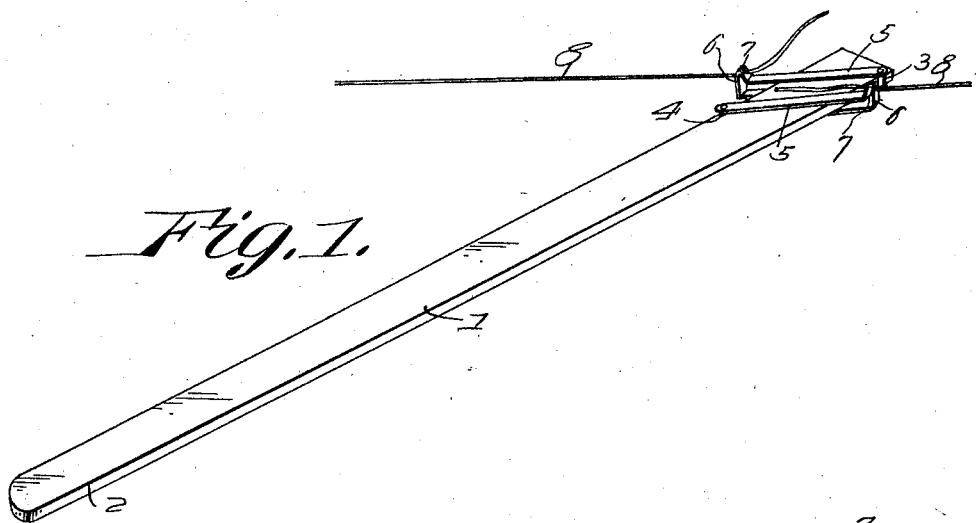
Figure 1 is a perspective view of the invention showing the practical application of the same.
Figure 2:
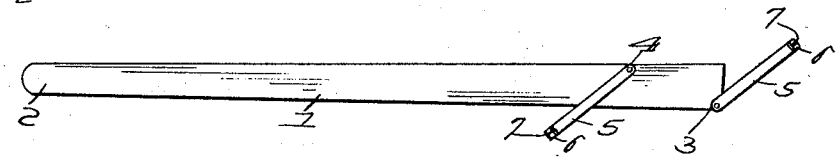
Fig. 2 is a plan view of the lever for operating the device.
Figure 3:
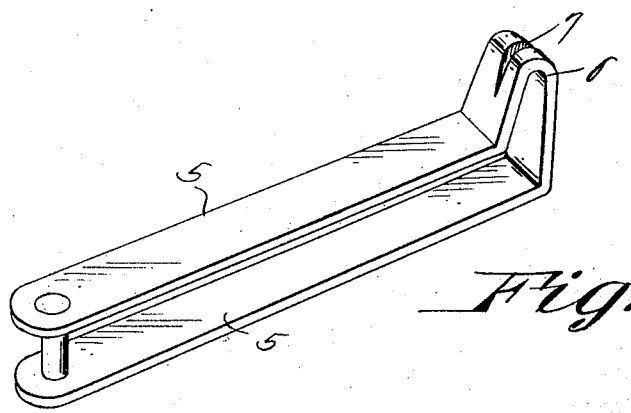
Fig. 3 is a perspective view of one of the links coöperating with the lever, the grab for the link being attached thereto.
Figure 4:
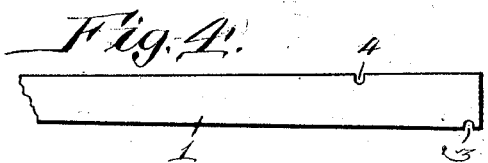
Fig. 4 is a plan view of the forward end of the lever showing the notches in which the grabs are attached.

As shown, the invention comprises the lever 1 tapering in the direction of its length to form a handle portion 2. This lever is relatively wide as compared with its thickness and on one edge adjacent the end remote from the handle, there is formed a transverse notch 3. At a specified distance from the notch 3 but on the opposite edge of the lever, there is formed a second transverse notch 4.

Attachable to the lever are links 5, each of which is made of a flat metal strip bent back on itself to provide two parallel elements for disposition against opposite faces of the lever, both elements being upturned adjacent their connecting ends to provide a claw 6 which is notched, as shown at 7, to provide a seat or grab for the wire being operated upon. The two elements of the link remote from the claw 6 are connected by a pin or stud 9 which is circular in cross section and adapted to engage one of the notches 3 or 4 in the lever, whereby the link is permitted to swing with reference to the lever with the pin or stud 9 as a pivot. The notch or slot 7, it will be observed, is of tapering shape, thus forming a crotch at its apex in which the wire may readily be engaged and secured at the time of the imposition of a strain upon the wire, as in the stretching operation.

The links 5 at those ends remote from the grab 6 engage in the notches 3 and 4 of the lever, as shown, and the broken ends of the wire 8 are engaged each in the notch 7 of one of the grabs. When the lever 1 is so positioned relative to the wire 8 that its notch 3 is closer to that end of the wire engaged by its grab than is the notch 4, the wire is under the least tension or practically no tension. As the lever 1, however, is moved to assume a position substantially opposite the first position, the relative positions of the notches 3 and 4 with reference to the engaged ends of the wires 8 is reversed with the result that the two sections of the wire are subjected to a high tension, thus positioning the broken ends so that the two may be easily attached together.

The invention having been described, what is claimed as new and useful is:

A device of the kind described comprising a lever having notches formed on opposite edges of which one is adjacent the end of the lever and the other spaced from the said end, and a pair of rectangular links each of which is formed from a piece of flat strip metal bent back on itself to provide two parallel elements for disposition against opposite faces of the lever, the connecting ends of said elements being upturned to provide a grab formed with a tapered slot constituting a wire seat, the ends of the said elements remote from the grab being spanned by a round pin seating in one of the notches of said lever in the manner and for the purpose specified.

In testimony whereof I affix my signature.

FRED FRANK.